United States Patent Office 2,715,645
Patented Aug. 16, 1955

2,715,645

N-ARYL AND N-ARALKYL DERIVATIVES OF N-DIALKYLAMINOALKYL-ARYLOXYALKANO-AMIDES AND METHODS FOR THEIR PRODUCTION

John W. Cusic, Skokie, Ill., assignor to G. D. Searle & Co., Chicago, Ill., a corporation of Illinois No Drawing. Application July 16, 1952,
Serial No. 299,220

15 Claims. (Cl. 260—559)

The present invention relates to a group of new organic compounds and in particular to the N-aryl and N-aralkyl derivatives of N-dialkylaminoalkyl-aryloxyalkanoamides, to their salts and to methods for their production. By this invention I have provided new compositions of matter which can be represented by the basic structural formula

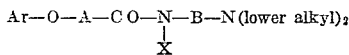

wherein A and B are lower alkylene radicals, Ar is a monocyclic aromatic radical and X is either a radical of the same type as Ar or a lower aralkyl radical.

In the foregoing structural formula Ar and X can represent lower monocyclic aromatic hydrocarbon radicals containing 6 to 10 carbon atoms such as phenyl, tolyl, xylyl, cumyl and butylphenyl, as well as their halogenated derivatives such as fluorophenyl, chlorophenyl, bromophenyl and iodophenyl. In addition the radical X can represent an aromatic hydrocarbon radical attached to the amido nitrogen by a lower alkylene radical as in the case of benzyl, phenethyl, phenylpropyl and phenylbutyl radicals. The radicals A and B are straight and branch chained lower alkylene radicals such as ethylene, propylene, butylene, amylene, hexylene and polymethylene radicals such as trimethylene, tetramethylene and octamethylene. While the radical A can also represent a methylene radical, the radical B should separate the two nitrogen atoms attached thereto by at least two carbon atoms. The lower alkyl radicals in the dialkylamino group can be methyl, ethyl, straight and branch chained propyl, butyl, amyl and hexyl groups. Valuable compounds are also obtained where the dialkylamino radical is part of a heterocyclic radical as in the case of pyrrolidino, piperidino and morpholino rings.

The organic bases of the foregoing type form salts which are non-toxic in therapeutic dosage with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, naphthylmethyl chloride, dimethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide novel chemical substances of the type indicated above. These new substances have been found to possess a number of highly useful therapeutic properties. Thus the amides of this invention have shown potent diuretic properties. They are also active cardiovascular drugs, producing vasodilatation and reduction in blood pressure. The quaternary salts produce a blocking effect on the transmission of sympathetic and parasympathetic impulses through the autonomic ganglia. The nuclearly halogenated compounds have shown amebacidal properties.

My invention will be described more fully in conjunction with the following examples. It should be understood that these examples are given by way of illustration only and that the invention is not to be construed as limited in spirit or in scope by the details set forth. It will be apparent to those skilled in the art that many modifications in materials and methods may be practiced without departing from the invention. In each of these examples temperatures are given in degrees centigrade (° C.), relative amounts of materials in parts by weight and pressures during vacuum distillations in millimeters (mm.) of mercury.

The present application is a continuation-in-part of my copending application, Serial No. 166,075, filed June 3, 1950, now abandoned.

EXAMPLE 1

*N-(β-diethylaminoethyl)-α-phenoxyacetanilide*

A solution of 110 parts of phenoxyacetylchloride and 192 parts of diethylaminoethylaniline in 2600 parts of benzene is heated at refluxing temperature for 15 hours. On cooling an oily precipitate forms. The oily hydrochloride is separated and stirred with an excess of dilute sodium carbonate solution. The N-(β-diethylaminoethyl)-α-phenoxyacetanilide is extracted with ether, the ether extract is dried over anhydrous potassium carbonate, filtered and evaporated. The residue is purified by vacuum distillation at 1 mm. pressure and about 200 to 205° C. The structural formula of this compound is

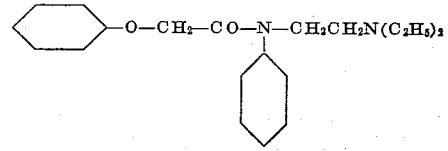

EXAMPLE 2

*β-(N-(α-phenoxy)acetanilido)ethyldiethylmethylammonium iodide*

100 parts of the basic N-(β-diethylaminoethyl)-α-phenoxyacetanilide in 600 parts of butanone are treated with 227 parts of methyl iodide in a shielded pressure bottle at 0° C. for 12 hours. In order to induce precipitation, this mixture is treated with ether. The oily precipitate which forms is separated and the adhering solvent removed by evaporation. Upon standing the β-(N-(α-phenoxy)acetanilido)ethyldiethylmethylammonium iodide solidifies. Recrystallization from butanone yields white crystals which melt at about 114 to 115° C. To prepare the citrate, three mols of this iodide are treated in methanol solution with one mol of silver citrate and two mols of citric acid. The cation has the structural formula

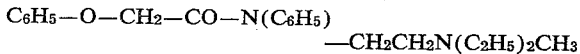

EXAMPLE 3

*N-(β-diethylaminoethyl)-α-phenoxypropionanilide*

A mixture of 184 parts of α-phenoxypropionyl chloride and 192 parts of N-diethylaminoethylaniline in 2600 parts of benzene is heated at refluxing temperature for 15 hours. Addition of alkali yields the basic N-(β-diethylaminoethyl)-α-phenoxypropionanilide which is purified by distillation at about 190 to 192° C. at 1 mm. pressure. Treatment with hydrogen chloride yields a sticky hydrochloride which solidifies on standing at 0° C. Upon recrystallization from isopropanol white crystals melting at about 147–149° C. are obtained.

EXAMPLE 4

*β-(N-(α-phenoxy)propionanilido)ethyldiethylmethyl-
ammonium iodide*

100 parts of the basic N-(β-diethylaminoethyl)-α-phenoxypropionanilide are treated with 227 parts of methyl iodide in 60 parts of butanone in a shielded pressure bottle at 0° C. After 24 hours the crystals which have formed are collected on a filter and recrystallized from isopropanol. The white crystals consist of β-(N-(α-phenoxy)propionanilido)ethyldiethylmethylammonium iodide, melting at about 148 to 149° C. The structure of this salt is

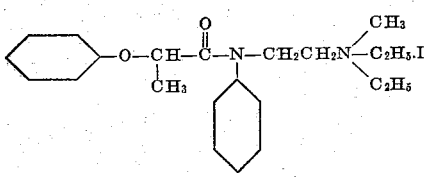

EXAMPLE 5

*N-(β-diethylaminoethyl)-α-(p-tert. butylphenoxy)
propionanilide*

150 parts of α-(p-tert. butylphenoxy)propionic acid in 300 parts of chloroform are treated with 205 parts of thionyl chloride and on subsidance of the initial reaction the mixture is heated at reflux temperature for 2 hours. After vacuum distillation of the solvent and the excess thionyl chloride the α-(p-tert. butylphenoxy)propionyl chloride is distilled at about 157° C. and 27 mm. pressure.

240 parts of the distillate and 192 parts of N-(β-diethylaminoethyl)aniline in 2400 parts of benzene are heated at reflux temperature for 2 hours, cooled and treated with a large volume of dilute hydrochloric acid. The aqueous layer is separated, rendered alkaline by addition of potassium hydroxide and extracted with ether. The ether extract is dried over anhydrous potassium carbonate, filtered and evaporated to yield the N-(β-diethylaminoethyl)-α-(p-tert. butylphenoxy)propionanilide which is distilled at about 214–216° C. and 2 mm. pressure.

An ether solution of the distillate is treated with one equivalent of anhydrous hydrogen chloride in isopropanol. Upon standing at 0° C. the crystalline hydrochloride separates which, recrystallized from ethyl acetate, melts at about 111–112° C. The compound has the structural formula

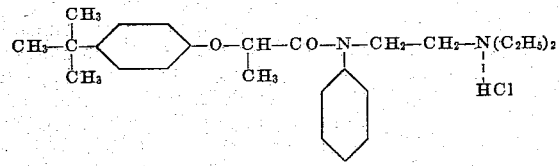

EXAMPLE 6

*N-diethylaminoethyl-N-(3-chlorophenyl)-α-(2,4-dichlorophenoxy)acetamide*

A mixture of 119 parts of 2,4-dichlorophenoxyacetyl chloride and 113 parts of N-(β-diethylaminoethyl)-3-chloroaniline in 1600 parts of butanone is heated at reflux temperature for 3 to 4 hours. Towards the end of the reaction a solid begins to precipitate. After cooling the precipitate is collected on a filter. The N-diethylaminoethyl - N - (3 - chlorophenyl) - α - (2,4 - dichlorophenoxy)-acetamide hydrochloride melts at about 155–156° C. It has the structural formula

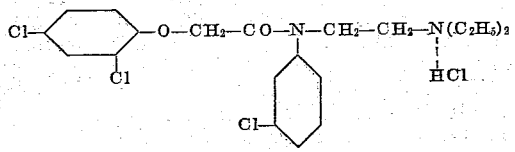

EXAMPLE 7

*N-diethylaminoethyl-N-(2,5-dichlorophenyl)-α-(2,4-dichlorophenoxy)acetamide*

239 parts of 2,4-dichlorophenoxyacetyl chloride and 261 parts of N-diethylaminoethyl-2,5-dichloroaniline in 1600 parts of butanone are heated at reflux temperature for 12 hours. The mixture is then concentrated to a syrup on the steam bath. After cooling solidification occurs on standing for about 2 hours. Upon recrystallization from ethyl acetate, white crystals of the hydrochloride of N-diethylaminoethyl-N-(2,5-dichlorophenyl)-α-(2,4-dichlorophenoxy)acetamide are obtained, which melt at about 168 to 169° C. It has the structural formula

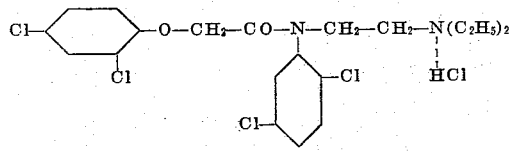

EXAMPLE 8

*N-dimethylaminoethyl-N-(p-bromophenyl)-β-(o-iodophenoxy)-propionamide*

A mixture of 310 parts of β-(o-iodophenoxy)-propionyl chloride and 257 parts of N-dimethylaminoethyl-p-bromoaniline in 2000 parts of butanone are heated at reflux temperature for 12 hours. The solvent is then distilled off until a syrup remains. Upon standing at room temperature the solid hydrochloride of N-dimethylamino-N - (p - bromophenyl) - β - (o - iodophenoxy)propionamide forms which can be crystallized from ethyl acetate in the form of white needles. It has the structural formula

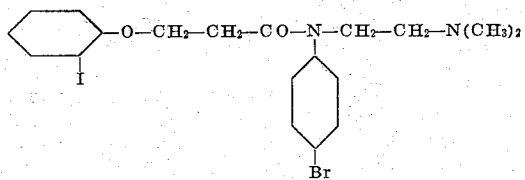

EXAMPLE 9

*N-diisopropylaminoethyl-N-(o-iodophenyl)-α-(p-fluorophenoxy)-acetamide*

144 parts of p-fluorophenoxyacetyl chloride are heated at reflux temperature for 12 hours with a solution of N-diisopropylaminoethyl-o-iodoaniline in 1200 parts of 2-butanone. The mixture is concentrated on the steam bath to the consistency of syrup, then cooled, and permitted to stand. The precipitate is boiled with ethyl acetate using charcoal as decolorizing agent and the hydrochloride of the N-diisopropylaminoethyl-N-(o-iodophenyl)-α-(p-fluorophenoxy)acetamide is obtained in the form of colorless needles. It has the structural formula

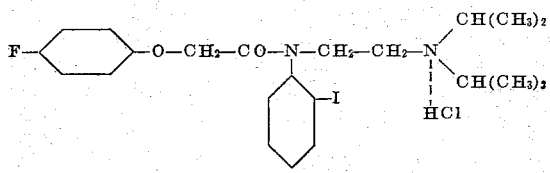

EXAMPLE 10

*N-(β-diethylaminoethyl)-N-benzyl-α-phenoxyacetamide*

A mixture of 170 parts of phenoxyacetyl chloride and 206 parts of N-(β-diethylamino)benzylamine in 1700 parts of benzene is heated at reflux temperature for one hour and then treated with ice and dilute hydrochloric acid. The aqueous layer is separated, rendered alkaline by addition of sodium hydroxide and extracted with ether. The ether extract is dried over anhydrous potassium carbonate, filtered and evaporated, yielding the N-(β-diethylaminoethyl)-N-benzyl-α-phenoxyacetamide as an oily residue which is distilled at about 216–218° C. and 1 mm. pressure. It has the structural formula

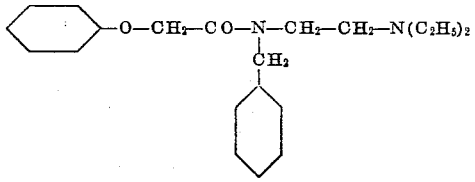

EXAMPLE 11

*N -(β-diethylaminoethyl) - N - (α-phenethyl)-α-phenoxyacetamide*

240 parts of acetophenone and 220 parts of ethanol are treated with 232 parts of N,N-diethylethylenediamine and 150 parts of Raney nickel with slight warming. The mixture is then introduced into a Parr bomb and hydrogenated therein at about 130° C. under 500–600 lbs. pressure for 6 hours. After cooling the contents of the bomb are filtered and the solvent is removed from the filtrate by distillation. The residue, consisting of N-(β-diethylaminoethyl)-α-phenethylamine is distilled at about 128–130° C. and 8 mm. pressure.

220 parts of this distillate are heated with 170 parts of phenoxyacetyl chloride in 1700 parts of benzene at reflux temperature for one hour. After cooling the mixture is treated with dilute hydrochloric acid and the acidic layer is separated and rendered alkaline by addition of sodium hydroxide. The basic solution is extracted with ether and the ether extract is dried over anhydrous potassium carbonate, filtered and evaporated. The N-(β-diethylaminoethyl)-N-(α-phenethyl)-α-phenoxyacetamide is distilled at about 204–205° C. and 1 mm. pressure. It has the structural formula

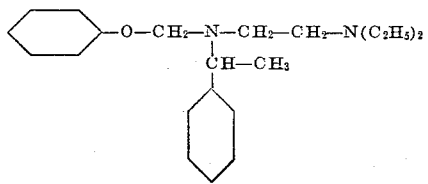

EXAMPLE 12

*N -(δ - dimethylaminobutyl)-N-(p-isopropylbenzyl)-β-(p-toloxy)propionamide*

A mixture of 148 parts of p-isopropylbenzaldehyde, 116 parts of N,N-diethylputrescine, 400 parts of ethanol and 50 parts of Raney nickel is hydrogenated in a Parr medium pressure bomb at 600 lbs. pressure and 75° C. for 5 hours, cooled and filtered. The filtrate is vacuum distilled yielding the N-(δ-dimethylaminobutyl)-p-isopropylbenzylamine as an oil at about 102–110° C. and 0.2 mm. pressure.

A mixture of 100 parts of the distillate and 80 parts of β-(p-toloxy)propionyl chloride in 1200 parts of toluene is heated at reflux temperature for 2 hours and then treated with ice and dilute hydrochloric acid. The aqueous layer is separated, washed with ether, rendered alkaline by addition of sodium hydroxide and extracted with ether. This ether extract is dried over anhydrous calcium sulfate, filtered and evaporated to yield the N-(δ-dimethylaminobutyl) - N - (p-isopropylbenzyl)-β-(p - toloxy)propionamide as an oil residue which boils at about 210–220° C. and 2 mm. pressure. It has the structural formula

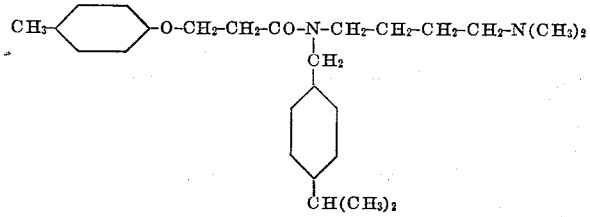

EXAMPLE 13

*N -(β - diethylaminoethyl)-N-benzyl-α-(p-tert. butylphenoxy)propionamide*

A solution of 240 parts of α-(p-tert. butylphenoxy)propionyl chloride and 206 parts of N-(β-diethylaminoethyl)-benzylamine in 2400 parts of benzene is heated at reflux temperature for 2 hours, cooled and extracted with dilute hydrochloric acid. The extract is rendered alkaline by addition of sodium hydroxide and extracted with ether. This ether extract is dried over anhydrous potassium carbonate, filtered and evaporated to yield the N-(β-diethylaminoethyl)-N-benzyl-α-(p - tert. butylphenoxy)propionamide as an oil which is distilled at about 212–214° C. and 2 mm. pressure. The compound has the structural formula

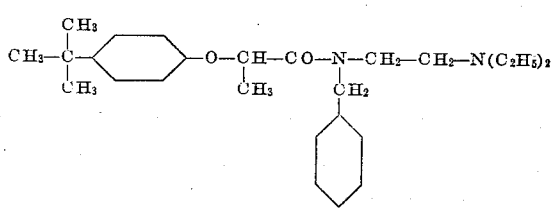

EXAMPLE 14

*N-(β-diethylaminoethyl) - N - (α-phenethyl)-α-(o-chlorophenoxy)acetamide*

240 parts of acetophenone in 220 parts of ethanol are treated with 232 parts of N,N-diethylethylenediamine and 150 parts of Raney nickel with slight warming. The mixture is then introduced into a Parr bomb and hydrogenated therein at about 130° C. under 500–600 lbs. pressure for 6 hours. After cooling the contents are filtered and the solvent is removed from the filtrate by distillation. The N-(β-diethylaminoethyl)-α-phenethylamine is distilled at about 128–130° C. at 8 mm. pressure.

A mixture of 220 parts of this distillate and 205 parts of o-chlorophenoxyacetyl chloride in 1700 parts of anhydrous toluene is heated at reflux temperature for 2 hours, cooled and extracted with dilute hydrochloric acid. The extract is rendered alkaline by addition of potassium hydroxide and extracted with ether. This ether extract is dried over anhydrous potassium carbonate, filtered and evaporated to yield the N-(β-diethylaminoethyl) - N - (α - phenethyl) - α - (o - chlorophenoxy)acetamide as an oil. An ether solution of this oil is treated with one equivalent of alcoholic hydrogen chloride. On standing the crystalline hydrochloride precipitates which, recrystallized from a mixture of isopropanol and ethyl acetate, melts at about 133–134° C. The salt has the structural formula

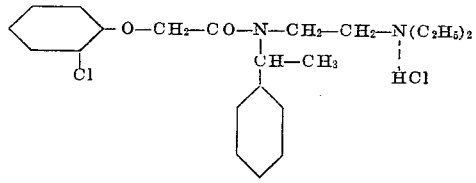

I claim:
1. An amide of the structural formula

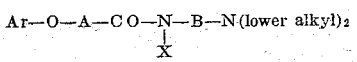

wherein Ar is a member of the class consisting of aryl hydrocarbon radicals containing 6 to 10 carbon atoms and monocyclic haloaryl radicals containing 6 to 10 carbon atoms; X is a member of the class consisting of monocyclic aryl hydrocarbon radicals containing 6 to 10 carbon atoms, monocyclic haloaryl radicals containing 6 to 10 carbon atoms and radicals in which a monocyclic aryl hydrocarbon radical of 6 to 10 carbon atoms is attached to the amido nitrogen atom through a lower alkylene radical; A is a lower alkylene radical; and B is a lower alkylene radical separating the 2 nitrogen atoms attached thereto by at least 2 carbon atoms.

2. An amide of the structural formula

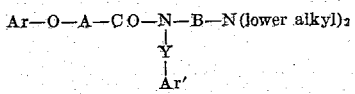

wherein Ar and Ar' are monocyclic aryl hydrocarbon radicals containing 6 to 10 carbon atoms; A and Y are lower alkylene radicals; and B is a lower alkylene radical separating the 2 nitrogen atoms attached thereto by at least 2 carbon atoms.

3. An amide of the structural formula

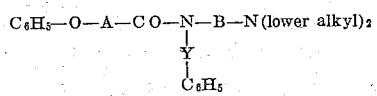

wherein A and Y are lower alkylene radicals and B is a lower alkylene radical separting the 2 nitrogen atoms attached thereto by at least 2 carbon atoms.

4. An amide of the structural formula

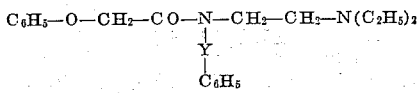

wherein Y is a lower alkylene radical.

5.

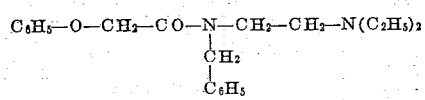

6.

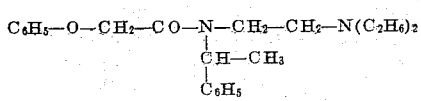

7. An amide of the structural formula

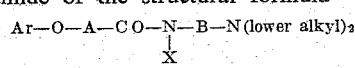

wherein Ar and X are monocyclic aryl hydrocarbon radicals containing 6 to 10 carbon atoms, A is a lower alkylene radical and B is a lower alkylene radical separating the 2 nitrogen atoms attached thereto by at least 2 carbon atoms.

8. An amide of the structural formula

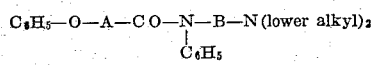

wherein A is a lower alkylene radical and B is a lower alkylene radical separting the 2 nitrogen atoms attached thereto by at least 2 carbon atoms.

9. An amide of the structural formula

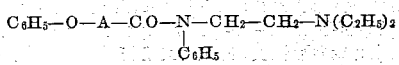

wherein A is a lower alkylene radical.

10. An amide of the structural formula

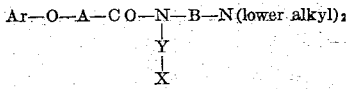

wherein Ar is a halophenyl radical, X is a monocyclic aryl hydrocarbon radical, A and Y are lower alkylene radicals and B is a lower alkylene radical separating the 2 nitrogen atoms attached thereto by at least 2 carbon atoms.

11. An amide of the structural formula

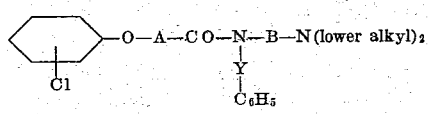

wherein A and Y are lower alkylene radicals and B is a lower alkylene radical separating the 2 nitrogen atoms attached thereto by at least 2 carbon atoms.

12. An amide of the structural formula

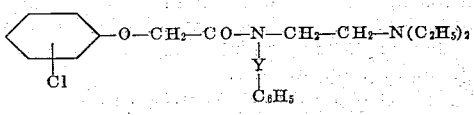

wherein Y is a lower alkylene radical.

13. An amide of the structural formula

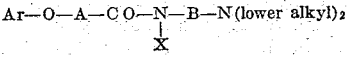

wherein Ar and X are halophenyl radicals, A is a lower alkylene radical and B is a lower alkylene radical separating the 2 nitrogen atoms attached thereto by at least 2 carbon atoms.

14. An amide of the structural formula

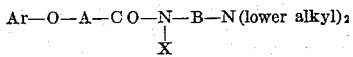

wherein Ar and X are chlorophenyl radicals, A is a lower alkylene radical and B is a lower alkylene radical separating the 2 nitrogen atoms attached thereto by at least 2 carbon atoms.

15. An amide of the structural formula

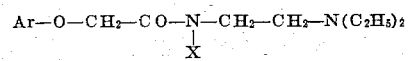

wherein Ar and X are chlorophenyl radicals.

References Cited in the file of this patent
UNITED STATES PATENTS

| | | |
|---|---|---|
| 2,009,144 | Miescher et al. | July 23, 1935 |
| 2,428,978 | Martin et al. | Oct. 14, 1947 |

FOREIGN PATENTS

| | | |
|---|---|---|
| 368,590 | Great Britain | Mar. 10, 1932 |